Jan. 6, 1970   M. BAERMANN   3,488,534
PERMANENT MAGNET COUPLING SYSTEM WITH MAGNETIC DAMPING
Filed Aug. 7, 1968

INVENTOR.
MAX BAERMANN
BY
Meyer, Tilberry & Body
ATTORNEYS

United States Patent Office 3,488,534
Patented Jan. 6, 1970

3,488,534
PERMANENT MAGNET COUPLING SYSTEM WITH MAGNETIC DAMPING
Max Baermann, 506 Bensberg, Wulfshof, Bezirk Cologne, Germany
Filed Aug. 7, 1968, Ser. No. 750,803
Claims priority, application Germany, Aug. 14, 1967, 1,613,022
Int. Cl. H02k 49/10
U.S. Cl. 310—93                    8 Claims

ABSTRACT OF THE DISCLOSURE

An eddy current coupling system having damping means for attenuating surges of magnetic flux caused by magnetizing and demagnetizing permanent magnets with pulses of electric current. The permanent magnets are provided with magnetically permeable pole shoes at their pole surfaces, and each pole shoe is contiguous to an electrically conductive damping member. An electrically conductive coil is wound about each of the permanent magnets between their pole surfaces, adjacent coils being connected to cause opposite polarity in adjacent magnets, and the coils are energized with electric current pulses to vary the magnetic coupling. The damping members prevent sudden and jerking transitions from one coupling state to the next.

---

This application pertains to the art of permanent magnet coupling systems and, more particularly, to a permanent magnet system with the magnetization of the magnets being controlled by current pulses.

The invention is particularly applicable to eddy current brakes or clutches for vehicles and will be described with particular reference thereto, although it will be appreciated that the invention has broader applications, such as for devices where rotary motion is transmitted from one device to a second device with need for a smooth transition.

In the art of permanent magnet type eddy current couplings, the energizing or deenergizing of same has been accomplished in the following ways: regulating the distance between the eddy current path and the permanent magnets which create the flux field; using the generated eddy current to create a contramagnetic flux which is returned to the permanent magnets by means of magnetically permeable members; varying the magnetic flux of a plurality of permanent magnets, each adapted to produce a magnetic flux field by energizing a coil associated with each magnet with electrical current impulses of suitable size and direction to permanently magnetize or demagnetize the permanent magnets in desired amounts and provide a resultant flux field to reflect the desired function. The last mentioned permanent magnet system has been disclosed in a patent issued to me on Nov. 13, 1962, Patent No. 3,064,149.

Even though the invention of the above-referenced patent overcomes many of the difficulties of variable flux permanent magnet systems, one of the problems which exists and which is solved by the present invention is providing a smooth transition in the coupling force between the coupled members during the time that the coil windings are energized with electrical current pulses.

The present invention contemplates a new and improved, variable flux permanent magnet system which overcomes the above-referred to difficulties, and others, which is simple in operation and where the electric current pulses used for magnetizing or demagnetizing the permanent magnets do not adversely affect the coupling action.

In accordance with the present invention, a permanent magnet coupling system is provided comprised of at least two spaced permanent magnets each having a pole shoe at the end facing an eddy current disc, in combination with a coil for each magnet for magnetizing or demagnetizing the permanent magnets in desired amounts by means of current pulses, and a closed electrically conductive loop surrounding at least a portion of the individual pole shoes for damping surges of magnetic flux caused by the pulses of electric current applied to the coils.

Further in accordance with the invention, a magnetically operated coupling system with the coupling controlled by variable electric current pulses is provided wherein the permanent magnets have a common axis of polarization and have their like pole surfaces opposing each other with a soft iron member interposed and contiguous to the like pole surfaces of the respective magnets.

The principal object of the invention is the provision of a new and improved permanent magnet system wherein the flux of the system is changed by pulses of current and wherein surges of magnetic flux caused by such pulses are damped out and a smooth transition of the degree of coupling results.

Another object of the invention is the provision of a new and improved variable flux permanent magnet system which is simple in construction, compact in size, light in weight, does not require the use of mechanical, hydraulic, or electric transmissions for the purpose of varying the flux.

Another object of the invention is the provision of a new and improved variable flux permanent magnet system having a member to damp out rapid changes in the flux, and the damping member also serves as a support for the magnet system.

The invention may take physical form in certain parts and arrangement of parts, preferred embodiments of which will be described in detail in the specification and illustrated in the accompanying drawings which form a part hereof and wherein.

Figure 1:
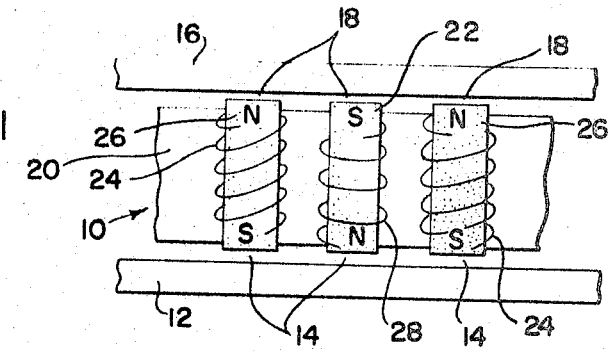
FIGURE 1 is a partial schematic, elevational view of a known eddy current brake with the permanent magnets alternately poled.
Figure 2:
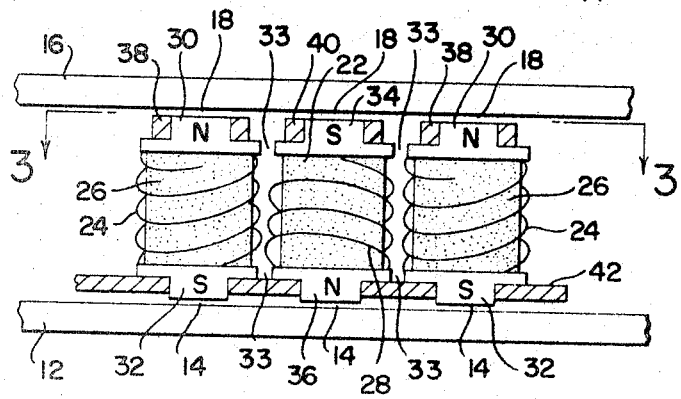
FIGURE 2 is a schematic elevational view, partially in section, of an eddy current coupling with magnetic damping according to a preferred embodiment of the invention.
Figure 3:
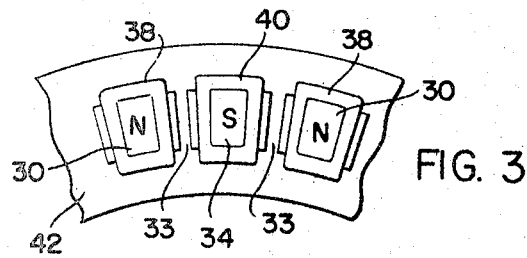
FIGURE 3 is a sectional view along the line 3—3 of FIGURE 2.

Referring now to the drawings wherein the showings are for the purposes of illustrating the preferred embodiments of the invention only and not for the purposes of limiting same, FIGURES 2 and 3 show one embodiment of the invention in contrast to a known eddy current brake shown in FIGURE 1. FIGURE 1 shows a permanent magnet arrangement 10 positioned between first and second eddy current discs 12, 16 and spaced therefrom by air gaps 14, 18, respectively. The magnet arrangement 10 is comprised of permanent magnets 22, 26 fastened to a support 20, which may be made of a ferromagnetic material. Each of the permanent magnets 22, 26 has a coil of conductive wire 28, 24, respectively, wound around them between their respective north and south pole surfaces. The coils 24, 28 are periodically energized by a current pulse of varying magnitude and direction in order to magnetize or demagnetize the permanent magnets so as to provide a variable braking moment on the eddy current discs 12, 16. A current pulse generator may be used advantageously for this purpose, or any suitable method may also be used.

The permanent magnets 22, 26 are permanently magnetized or demagnetized according to the magnitude of the electric current pulses supplied to the coil windings 28, 24. The desired braking or clutching moment is thus achieved by varying the magnitude of the electric current pulse, and when relatively high current pulses are used, very high magnetic field strength of short duration are produced. This results in sudden or jerking moments on the eddy current discs 12, 16 which is caused by the surges of magnetic flux. A smooth transition in the degree of coupling with the discs is usually desirable whenever rotary motion is coupled from one shaft to another. This avoids mechanical vibration effects which necessarily result when the coupling transition is not smooth.

The embodiment of this invention shown in FIGURE 2 substantially eliminates the problem of jerking transition when relatively high current pulses are applied to the coil windings 24, 28. In this embodiment, pole shoes 30, 32 are fastened to the north and south pole surfaces, respectively, of permanent magnet 26. The alternately poled permanent magnet 22 has identical pole shoes 34, 36 fastened to its pole surfaces. An air gap 33 is formed between the adjacent pole shoes. The pole shoes 32, 36 are supported on a damping plate 42 provided with openings through which a substantial portion of pole shoes 32, 36 project. The damping plate is formed of electrically conductive material, preferably copper, and forms a closed current loop around each of the pole shoes. In this configuration, the damping plate 42 reduces the transitional surge of flux in eddy current discs 12, 16 during the time that a pulse of current is applied to coils 24, 28. At the opposite end of each permanent magnet, a coil preferably a one turn loop of conductive metal, forms closed loops 38 and 40 around the pole shoes 30 and 34, respectively, which also serves to damp the high induced magnetic fields caused by relatively high current pulses applied to the coils 24, 28. An additive damping effect is also provided by the proximity of a portion of pole shoes 30, 34 forming the air gap 33. This relatively small air gap 33 provides a shunt path introducing additional reluctance into the magnetic circuit so as to reduce the flux in air gaps 14, 18, and thus reduce surges of magnetic flux.

It should be recognized that the damping plate 42 serves both as a support for the pole shoes 32, 36 as well as their associated magnets 26, 22, respectively, and prevents rapid changes in the eddy current braking action during relatively high pulses of current. It should also be recognized that a closed loop damping winding, identical to damping winding 38 on pole shoe 30, could be placed on pole shoe 32 instead of using the damping plate 42. A magnet support 20, similar to that of FIGURE 1, would then be necessary. Identical damping windings could be provided for each of the remaining pole shoes of the system.

FIGURE 3 illustrates the relationship existing between the damping windings 38, 40 of the permanent magnet system illustrated in FIGURE 2. This figure shows that the damping plate 42 may be annular in design, and pole shoes of each permanent magnet may be positioned therein. The pole shoes 30, 34 may be made from soft iron in order that they have an induced polarity corresponding to the pole suface of the permanent magnet to which they are contiguous. It should also be recognized that the closed looping damping windings 38, 40 shown in FIGURE 2 may be replaced by a cover damping plate identical to damping plate 42 in order to provide the damping effect on the changes in flux in the air gaps caused by current pulses. The question of whether to use damping plates or closed damping windings alone or in combination is considered a matter of design choice.

Figure 4:
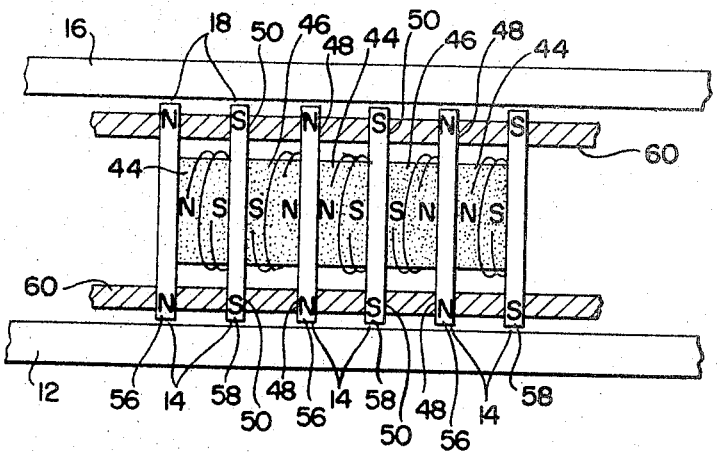
FIGURE 4 is a schematic elevational view, partially in section, of an eddy current coupling with magnetic damping and with the permanent magnets having a common axis of polarization.

A second embodiment of this invention is illustrated in FIGURE 4, wherein a permanent magnet arrangement is positioned between a pair of eddy current discs 12, 16. The permanent magnets 44, 46 have a common polar axis which is a circle coaxial with the eddy current discs 12, 16. The magnets 44, 46 are poled so that pole surfaces of like polarity face each other. A soft iron plate 56 is interposed between the facing north pole surfaces of magnets 44, 46, and similar soft iron plate 58 is interposed between the facing south pole surfaces of magnets 44, 46. The soft iron plates 56, 58 serve as pole shoes and form a first air gap 14 with respect to eddy current discs 12 and a second air gap 18 with respect to eddy current disc 16. Damping members 60, having an annular shape coaxial with the annular ring of magnets and having rectangular openings 48, 50, are secured to the soft iron plates 56, 58 in a spaced relationship between the ring of permanent magnets and the eddy current discs 12, 16. The damping members 60 are made from an electrically conductive material. Each of the permanent magnets 44, 46 has a coil of wire wound around them between the damping members 60, adjacent windings being connected to induce opposite polarity in the associated permanent magnets.

When the permanent magnets 44, 46 are being magnetized or demagnetized by current pulses in the windings, the effect of the high magnetic field strengths on the coupling with the discs is reduced by the damping members 60 in the same manner as that described for the damping plate in FIGURE 2. Surges of magnetic flux in the air gaps 14, 18 are reduced, and the coupling is smooth.

In the case of an eddy current brake having only one eddy current disc, the permanent magnet system may be arranged so that the alternately poled pole shoes are supported on a magnetically permeable carrier plate in order to shunt the relatively high reluctance of the air gap formed by adjacent pole shoes, while the remaining pole shoes are provided with a closed electrically conductive loop or a damping member in order to magnetically damp surges of magnetic flux between the magnet system and the eddy current disc.

The invention has been described with reference to the preferred embodiment. Obviously, modifications and alternations will occur to others upon a reading and understanding of the specification. It is my intention to include all such modifications and alterations insofar as they come within the scope of the appended claims or the equivalence thereof.

What is claimed is:

1. A magnetically energized coupling system comprising:
at least two spatially positioned members of permanent magnet material, each of said members having a north pole surface and a south pole surface when magnetized;
a magnetically soft pole shoe proximate to each of said pole surfaces and having a corresponding magnetic induced polarity, said pole shoes being adapted to emanate flux across the space between a movably mounted electrically conductive element and said pole shoes, each said pole shoe being spaced from each adjacent pole shoe;
an electrically conductive coil wound about each said member between said pole surfaces, said coils being connected for alternate magnetic polarity on adjacent said members and adapted to be periodically pulsed to produce magnetic flux for magnetizing or demagnetizing said members;
means for damping the changes of flux in said space caused by said pulsing comprising a closed electrically conductive loop, said damping means substantially surrounding at least a portion of said pole shoes.

2. The magnetically energized coupling system of claim 1 wherein a plurality of said spatially positioned members are annularly arranged with their polar axes parallel to each other and are alternately poled.

3. The magnetically energized coupling system of claim 2 wherein said damping means is a separate electrically conductive closed loop around each said pole shoe.

4. The magnetically energized coupling system of claim 2 wherein said damping means is an electrically conductive plate having apertures through which said alternately poled pole shoes at a common end of said permanent magnets project, said pole shoes with said associated members being supported on said plate.

5. The magnetically energized coupling system of claim 2 wherein said damping means includes an electrically conductive plate having apertures through which said alternately poled pole shoes at a common end of said members project, said pole shoes with said associated members being supported on said plate, and said damping means also includes a separate, electrically conductive closed loop around each remaining said pole shoes.

6. The magnetically energized coupling system of claim 5 wherein said pole shoes have a greater cross-sectional area at the end contiguous to said pole surfaces of said members than said pole shoes have at the opposite end so that part of the magnetic flux is shunted through the relatively small air gaps formed by said spaced adjacent pole shoes to increase the magnetic damping during magnetizing or demagnetizing current pulses.

7. The magnetically energized coupling system of claim 1 wherein said spatially positioned members have a common axis of polarization and are poled with their like pole surfaces opposing, and a soft iron member is interposed contiguously between said like pole surfaces.

8. The magnetically energized coupling system of claim 7 wherein said system has a plurality of said members annularly arranged, said pole shoes have their longitudinal axes parallel with respect to each other and transverse to said common polar axis, and said damping means includes an electrically conductive plate having its longitudinal axis parallel to said common polar axis, said pole shoes extend through openings in said conductive plate.

References Cited

UNITED STATES PATENTS

| 2,482,875 | 9/1949 | Sawyer | 310—188 X |
| 3,064,149 | 11/1962 | Baermann | 310—93 |
| 3,316,514 | 4/1967 | Radus et al. | 335—291 |

DAVID X. SLINEY, Primary Examiner

U.S. Cl. X.R.

310—105